(12) United States Patent
Rao (10) Patent No.: US 8,639,602 B2
(45) Date of Patent: Jan. 28, 2014

(54) SYSTEM FOR AGENT ASSISTED MOBILE FUNDS TRANSFER AND MOBILE BANKING

(76) Inventor: Bindu Rama Rao, Laguna Niguel, CA (US)

( * ) Notice: Subject to any disclaimer, the term of this patent is extended or adjusted under 35 U.S.C. 154(b) by 237 days.

(21) Appl. No.: 13/277,300

(22) Filed: Oct. 20, 2011

(65) Prior Publication Data

US 2012/0041877 A1 Feb. 16, 2012

Related U.S. Application Data

(63) Continuation-in-part of application No. 12/799,600, filed on Apr. 27, 2010.

(51) Int. Cl.
*G06Q 40/00* (2012.01)
(52) U.S. Cl.
USPC .......................................................... 705/35
(58) Field of Classification Search
USPC .......................................................... 705/35
See application file for complete search history.

(56) References Cited

U.S. PATENT DOCUMENTS

| | | | | |
|---|---|---|---|---|
| 8,249,965 B2* | 8/2012 | Tumminaro | | 705/35 |
| 2007/0255662 A1* | 11/2007 | Tumminaro | | 705/79 |
| 2008/0291899 A1* | 11/2008 | Gromoll et al. | | 370/352 |
| 2009/0119190 A1* | 5/2009 | Realini | | 705/30 |
| 2013/0262268 A1* | 10/2013 | Gromoll et al. | | 705/26.61 |

* cited by examiner

Primary Examiner — Charles C Agwumezie (57) ABSTRACT

A system for managing funds transfer and banking that facilitates mobile funds transfers, mobile deposits, mobile withdrawal of funds by a user. These operations are conducted with the help of one or more agents, as necessary. The system for managing funds transfer and banking comprises a server to which a user can connect using a first mobile device or a computer/laptop. The server receives a funds transfer request from a first mobile device communicatively coupled to the server and it communicates a first one-time-use token to the first mobile device. The first mobile device is used by a sender of funds in a funds transfer operation. The sender approaches an agent who can facilitate funds transfer, for example by accepting cash/money from the sender and initiating funds transfer.

14 Claims, 3 Drawing Sheets

SYSTEM FOR AGENT ASSISTED MOBILE FUNDS TRANSFER AND MOBILE BANKING

CROSS REFERENCES TO RELATED APPLICATIONS

The present patent application is a continuation-in-parts of, claims priority to, and makes reference to U.S. non-provisional patent Ser. No. 12/799,600, entitled "MOBILE MONETARY TRANSACTIONS AND BANKING FOR RURAL POPULATIONS", filed on Apr. 27, 2010. The complete subject matter of the above-referenced U.S. Patent Application is hereby incorporated herein by reference, in its entirety.

The present patent application is a based on, and makes reference to U.S. non-provisional patent Ser. No. 12/221,876, entitled "Mobile device for access to agricultural services by non-literate and semi-literate users", filed on Aug. 6, 2008. The complete subject matter of the above-referenced U.S. Patent Application is hereby incorporated herein by reference, in its entirety.

The present patent application is based on and makes reference to U.S. non-provisional patent entitled QUESTIONNAIRE SERVER CAPABLE OF PROVIDING QUESTIONNAIRES BASED ON DEVICE CAPABILITIES, Ser. No. 11/807,672, filed May 30, 2007, which in turn is based on a U.S. provisional patent application Ser. No. 60/858,546, filed on Nov. 13, 2006. The complete subject matter of this referenced U.S. Patent Application is hereby incorporated herein by reference, in its entirety.

The present patent application is based on and makes reference to U.S. non-provisional patent entitled MOBILE WEB SYSTEM PROVIDING INTERCHANGABLE SERVICE WITH A MOBILE DEVICE, Ser. No. 12/011,238, filed Jan. 25, 2008, which in turn is based on U.S. non-provisional patent, Ser. No. 11/807,670, entitled "MOBILE DEVICE AND SERVER CAPABLE OF SUPPORTING ADHOC QUESTIONNAIRES", filed on May 30, 2007. The complete subject matter of the above-referenced U.S. patent application is hereby incorporated herein by reference, in its entirety.

BACKGROUND

1. Technical Field

This present invention relates generally to funds transfer and more specifically to employing a mobile phone for funds transfer between a sender and a receiver.

2. Related Art

In the last few years, Internet technologies have proliferated and millions of people use the Internet for business and for personal activities. In addition, social networks have taken off wherein a number of people can communicate with each other using Internet based systems such as Facebook. However, much of these technologies has not made its way to rural communities across the world, and has had limited impact on their lives.

There are several unmet needs for users who live in small rural communities, and some of these are being met by means of mobile phones. There is need for new solutions that can be managed, with proper control over who can conduct specific activities, especially for facilitating banking in places where there are no brick-and-mortar banks or ATM machines. Such solutions do not yet exist.

Mobile devices are becoming ubiquitous. People in urban areas carry them and so do people living in rural communities. Most people working in remote locations use mobile phones to stay in touch with their family, customers and take phone calls throughout the day.

Urban-oriented banks and financial institutions in the developing world, such as India, perceive business prospects in shifting focus to the rural sector. The rural Indian market, for example, a hitherto much neglected one, is now emerging as a large pool of high net worth individuals, traders, entrepreneurs, processing industries, marketing and warehousing agencies, market intermediaries, professionals, educational institutions, plantations and so on provides a wide range of business avenues and market for these institutions to diversify the risks and also seek growth.

Despite decades of effort and experimentation in banking, the organised financial sector is still not able to meet the credit gap in the rural sector. It took time for banks to realise the potential of the rural markets. Lack of infrastructure in the rural areas and the focus in the urban sector were some of the reasons. In view of this, there is great need for technology to provide support to the rural populace via an easy mode of access to bank accounts and credits, in addition to funds transfer facilities. There is a need to offer the banking sector an easy reach with minimal infrastructure. The situation is similar in other communities in the world, where commercial banking has made little inroads.

One of the main problems in rural places (villages, small towns, etc.) in the world is the lack of bank branches, ATM machines or other type of financial organizations in proximity to the rural communities. In addition, credit cards are of limited use as there are no departmental stores that accept credit cards or debit cards. Small rural stores do not have point-of-sale devices that are typically used for swiping credit cards and other type of cards to conduct purchases, etc.

Accordingly, the present invention addresses the need for rural people to conduct banking operations, access banking services, make payments to each other, send funds to each other, etc. despite the lack of traditional banking facilities such as ATM machines, banking counters and point-of-sale devices. The present invention enables easy & secure/payment, from without the need for any additional infrastructure costs to the users and the banks. In most rural places in the world, very few ATMs or bank facilities are in proximity to rural people. Very few rural people have bank accounts. In addition, very few point-of-sale (POS) devices are available or used in small stores and places of business. There is a need for simple-to-operate secure financial transaction means. There is also a need to support farmer-to-farmer transactions in rural places where there are no ATM machines available and no banking counters, etc. There is also a need to maintain records of transactions made by rural people as they buy and sell produce.

The present invention also addresses the need to identify an individual properly during mobile transactions, in general. There is a need to monitor transactions conducted on mobile phones. There is need to provide proper identification means, transaction control means, transaction approval means, etc. Mobile phones can be stolen and misused, user passwords can be stolen, PIN codes can be hacked (or guessed), etc. Thus, the identity of a user of a mobile phone needs to be properly ascertained and verified. The present invention addresses the "user identity" issue thereby making mobile transactions safer and more secure.

There are a few examples of technology where the mobile telephone network has been used for some types of mobile transactions. The Obopay system requires setting up accounts at Nokia stores and similar outlets initially by a user, and it involves associating a credit card with the user account for subsequent transactions. This makes it harder for rural people, especially those without a credit card, to participate. Once a credit card is associated, subsequent charges made for mobile purchases are conducted via the credit card. The Obopay system can be a burden on the rural user in India, as a network of Nokia stores or similar outlets may not be easily available. The Beam Card requires purchase of Beam Gift cards that are used as pre-paid cards for purchases by users. Beam does not provide mobile banking support, nor adhoc payment from one user to another when the users have not yet setup some kind of account or registered with them—rather it provides gift card purchases and payment against such gift cards. The Done card system used by OSS is also based on gift cards being purchased, often limited to small amounts (cannot be larger than a threshold such as Rs 10000) which limits what a person can do (cannot purchase two large bags of cement or two bags of fertilizers, or even a plane ticket to Delhi from Chennai). The whole gift-card based approach is rather limiting, in that the person has to track down a place where such giftcards are sold, which are often not in the proximity/vicinity of a user. Thus these are unsuitable for rural places.

Rural people do not carry credit cards/debit cards and point-of-sale devices are usually unavailable in stores found in rural areas, therefore credit card/debit cards (even if one possesses them) are rendered useless. Access to ready cash is also limited as rural areas (in India or in other rural communities all over the world) do not have reliable ATM machines. The other issue is that authentication of the user in an Indian rural setting via the traditional methods is a problem. Besides, there is a real problem of rural people being excluded from financial systems and the modern innovations in the banking sector, due to their lack of knowledge and limited access to financial education. The present invention addresses all of these problems faced by rural people (in India and other places) by providing a very simple, easy and very secure solution that would have a phenomenal reach with negligible costs to the user or to banks.

In view of the foregoing considerations, it is clear that there is a need for an improved system and method for financial transactions between people in rural communities, where there are very few (or none) ATM machines, banks, or modern point-of-sale devices.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

The present invention supports mobile funds transfer, specifically agent assisted funds transfer. More specifically, it supports funds transfers where a sender might have cash or a cheque and may not have a bank account, and therefore seeks the help of a registered agent (referred to as a sender agent) to help him with the funds transfer. The agent is expected to have a bank account where the agent has placed a minimum deposit, and to employ this previously deposited amount in a bank account to conduct funds transfers that an authorized receiver, after the agent is paid cash or by cheque by a sender. An agent who can help an intended target of a funds transfer (referred to as a receiver of funds) receive his funds is expected to pay the funds to the receiver and the get reimbursed with a similar amount, often with a commission for services rendered.

The present invention facilitates authentication of the sender and the receiver by a coordinating server, and approval of the funds transfer by a sender after viewing a digital photo of the receiver communicated by a receiver agent from his mobile device. In addition misuse by the receiver such as attempts to receive the funds multiple times are prevented. The misuse of the service by the receiver agent is prevented too, by the use of a photo taken of the receiver that is presented to the sender, and the explicit approval by the sender before money is transferred into an account associated with the recipient (receiver or the receiver agent, as the case may be).

Figure 1:
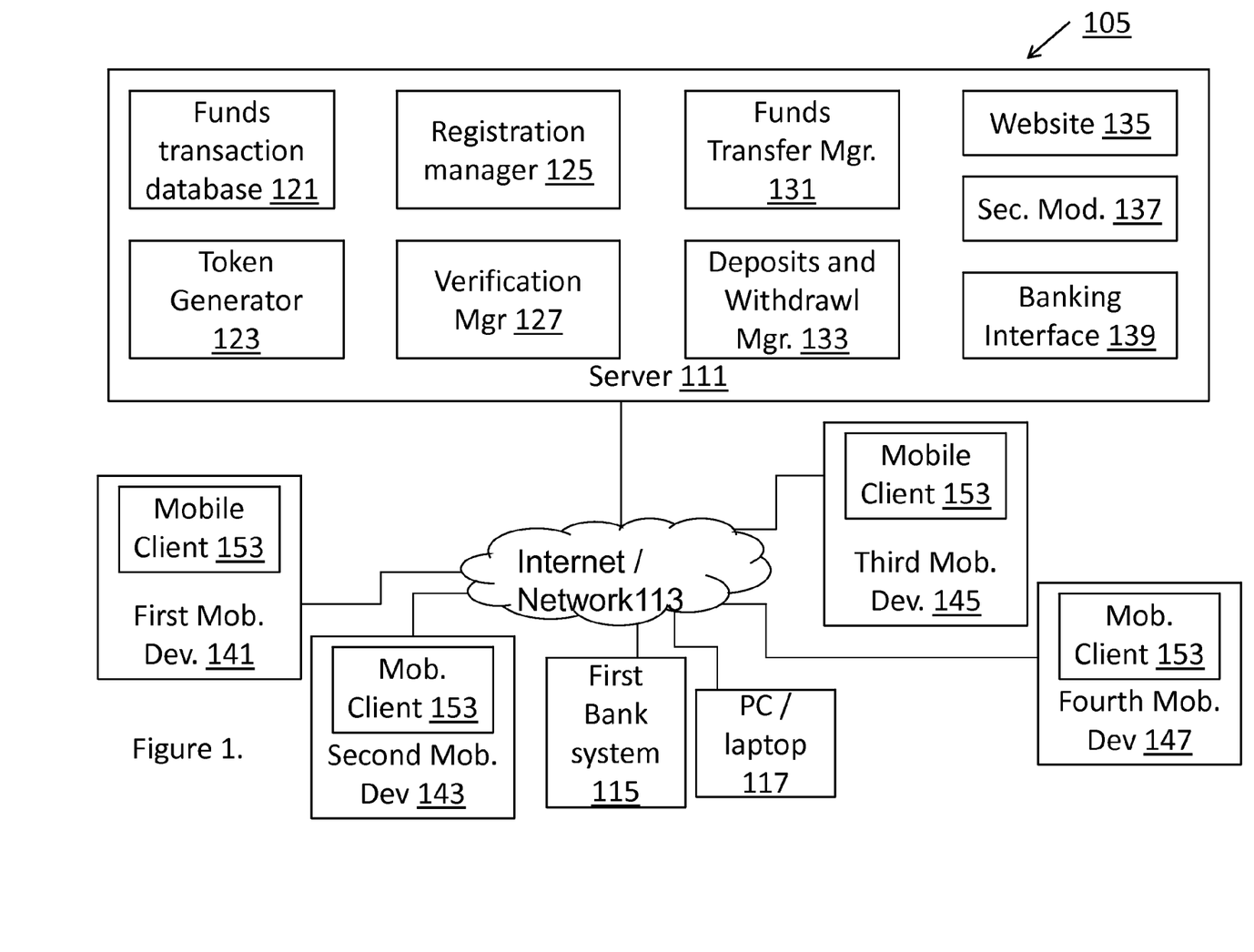
FIG. 1. is a perspective block diagram of a system for managing funds transfer and banking that facilitates mobile funds transfers, mobile deposits, mobile withdrawal of funds by a user.

FIG. 1. is a perspective block diagram of a system 105 for managing funds transfer and banking that facilitates mobile funds transfers, mobile deposits, mobile withdrawal of funds by a user. These operations are conducted with the help of one or more agents, as necessary. The system for managing funds transfer and banking comprises a server 111 to which a user can connect using a first mobile device 141 or a computer/laptop 117. The server 111 comprises a funds transfer manager 131 the coordinates the various activities involved in funds transfers, a token generator 123 that can create one-time-use tokens as needed, and a funds transaction database 121 that is used to store details of funds transfers, status of funds transfer transactions, details of bank accounts for sender agents, receiver agents, references to sender and receiver user accounts, sender and receiver profiles, historical data of funds transfers, reliability information of sender and receiver agents, location details of sender and receiver agents, etc.

The server 111 communicates with mobile devices 141, 143, 145, 147 and with external systems, such as a first bank system 115, or a PC/laptop 117 of a user, over Internet/network 113. It employs a banking interface 139 to interact with the first bank system 115.

The server 111 receives a funds transfer request from the first mobile device 141 communicatively coupled to the server 111 and it communicates a first one-time-use token to the first mobile device 141. The first mobile device 141 is used by a sender of funds in a funds transfer operation. The sender approaches an agent who can facilitate funds transfer, for example by accepting cash/money from the sender and initiating funds transfer. The server 111 receives a funds transfer initiation notice from a second mobile device 143 communicatively coupled to the server 111 and it communicates an acknowledgement message to the first mobile device 141. Thus the sender gets an acknowledgement from the server 111 when after the agent has initiated funds transfer, for example after receiving cash or a cheque from the sender.

The server 111 then determines an appropriate third mobile device 145 that can participate in funds transfer and communicates an incoming funds transfer transaction notice to the third mobile device 145. The third mobile device 145 is associated with a second agent, a receiver agent, who is ascertained to be in proximity to a receiver of the funds transfer. The server 111 communicates a funds available notice to a fourth mobile device 147 along with a second one-time-use token. The fourth mobile device 147 is associated with the receiver of the funds transfer operation. The server 111 receives a funds transfer activation request from the third mobile device 145 along with the second one-time-use token communicated by the third mobile device 145. The receiver using the fourth mobile device 147 communicates (such as by voicing out or using a Bluetooth means) the received second one-time-use token to the receiver agent. The receiver agent, using the third mobile device 145 provides the second one-time-use token back to the server 111 for verification.

The server 111 then sends a funds transfer approval request to the first mobile device 141, receives the first one-time-use token, and verifies it. The current application facilitates presenting a photo of the recipient to the sender of the funds, as part of the approval process. For example, the receiver agent can take a digital photo/image of the receiver and send it to the server 111 which includes that receiver's photo to the first mobile device 141 as part of the funds transfer approval request. The server 111 next sends a funds transfer completion confirmation request to the fourth mobile device 147 and receives a funds transfer completion confirmation response from the fourth mobile device 147.

In addition, the server 111 uses a banking interface 139 to interact with a first bank system 115 (external to the system 105), and also to interact with a second bank system (not shown). The server 111 communicates, employing the banking interface 139, a first transaction request to a first bank account at the first bank system 115 after receiving the funds transfer initiation notice. It also communicates, employing the banking interface 139, a second transaction request to the second bank system after receiving the funds transfer completion request. In one embodiment, first bank account at the first bank system 115 is associated with the sender of the funds. In a different embodiment, first bank account at the first bank system 115 is associated with a sender's agent facilitating the funds transfer by the sender. For example, the sender can provide cash/money/cheque to the sender's agent, who, using the second mobile device 143, communicates a funds transfer initiation notice to the server 111. The server 111 then sends the first transaction request to the first bank account at the first bank system 115 after receiving the funds transfer initiation notice, to transfer the funds from a bank account owned by and managed by (or associated with) the sender's agent, so that that amount can be sent to the intended recipient.

In one embodiment, the first bank and the second bank are the same bank. The bank account that is used to transfer the funds from and the bank account that receives that fund when it is transferred are in the same bank. For example, the bank accounts of the sender's agent and the receiver's agent are in the same bank. In the scenario where a sender is conducting the funds transfer without help from the sender's agent, using his own bank account as a source of funds, the sender's bank and the receiver agent's bank are the same bank.

In a related embodiment, the second mobile device 143 is not employed for funds transfer activity when the sender's agent is not involved in funds transfer, and the sender himself, using the first mobile device 141, conducts funds transfer. The server 111 receives the funds transfer initiation notice from the first mobile device 141 and communicates a subsequent the acknowledgement message to the first mobile device 141.

In a different embodiment, the first mobile device 141 is employed by a sender of funds, the fourth mobile device 147 is employed by a receiver of the funds, the second mobile device 143 is employed by a sender's agent associated with a first bank account managed by the first bank system 115, and the third mobile device 145 is employed by a receiver's agent associated with a second bank account managed by the second bank system (not shown, but external to the system 105). The funds transfer request comprises one or more items from a set comprising a transfer amount, an optional preferred transfer date, a recipient detail, and user identification, sender account identification, receiver account identification, receiver name, receiver address, receiver mobile phone number, receiver bank account information, preferred currency for transfer and a mobile transaction passcode.

Registered senders can typically login using a mobile client 153 in the first mobile device 141 and initiate funds transfer, especially when such funds transfer involve transferring funds from a bank account held by the sender at the first bank associated with the first bank system 141. Registered sender's agents can facilitate funds transfer by registered senders as well as by unregistered senders. A registration manager 125 in the server 111 facilitates sender and sender agent registrations (and for receiver and receiver agents too), such as by using the website 135 of the server 111.

In general, the server 111 identifies the receiver's agent from a set of registered agents maintained by the server, based at least on receiver address, and communicates a location information of the receiver's agent to the receiver of the funds via the fourth mobile device 147, along with the second one-time-use token. Location information, for example, comprises an address, GPS coordinates, a mobile phone number, a map, or a combination of these. The receiver is prompted to enter the second one-time-use token during the funds transfer process, and the server 111 verifies if that user input is correct, to authenticate the receiver. The server 111 is also able to ensure that the receiver does not receive the funds transferred more than once, and that is why the second one-time-use token, communicated to the receiver's, that the receiver shares with the receiver agent to get his funds that is transferred to him, is employed. At least one receiver agent is located such that the receiver can meet with that individual and receive the funds transferred, often in the form of cash, although in some embodiments, the receiver accepts cheques too (or a combination of cash and a cheque).

The server 111 comprises a banking interface 139 to a first bank system 115 that facilitates funds transfer operations. The server 111 communicates a first transaction request to the first bank system 115 employing the banking interface 139 after receiving the funds transfer initiation notice (created either by the sender or by the sender's agent), wherein the first transaction request identifies a first bank account, an amount (to be transferred), a second bank account with which a financial transaction must be conducted (the receiver of the transferred funds), and details of the second bank account. For example, the second bank account is associated with the receiver's agent (or the receiver himself in some embodiments). The server 111 receives confirmation from the first bank system 115 on successful end to the first transaction request and then communicates the incoming funds transfer transaction notice to the third mobile device 145 (typically the receiver agent's mobile phone) and the funds available notice to the fourth mobile device 147 (typically the receiver) along with a second one-time-use token.

The server 111 comprises a security module 137 to provide transport layer security as well as application layer security, and it supports SSL and TLS based secure communication too. It also comprises the registration manager 125, which facilitates registration by senders and receivers, so that their bank account information, addresses, and other details are known to the server 111—the user will not have to reenter them during an individual transaction, based on settings/preferences.

A verification manager 127 in the server 111 facilitates verification of user provided one-time-use tokens with reference ones sent to the user by the server 111. It also facilitates display of a receiver's photo, taken by the receiver's agent on the third mobile device 145 (for example) to enable recognition of the sender during the funds transfer approval request operation on the first mobile device 141. In one embodiment, an audio message provider by the receiver on the third mobile device 145 is also communicated to the first mobile device 141 via the server 111 to enable the funds transfer approval process. The server also keeps record of the receiver's voice and photos communicated by the third mobile device 145 for non-repudiation and monitoring.

The server 111 also comprises a deposits and withdrawal manager 133 that facilitates funds deposit by a user, and funds withdrawal by the user. For example, if a user has a bank account at the first bank and wants to deposit money into that account, instead of going to a brick-and-mortar bank, or to an ATM machine, the user can go to a sender's agent (or the receiver's agent) and give him his cash/cheque and he will be able to have it deposited into his bank account—the sender's agents bank account at the first bank will be used to transfer the associated amount into the bank account of the sender. The sender's mobile device—the second mobile device, comprises a mobile client that provides access to the server 111 for conducting such deposit and withdrawal operations for a sender wanting to deposit/withdraw funds. Similarly, a receiver's agent will be able to facilitate such deposit and withdrawal operations for a user.

Figure 2:
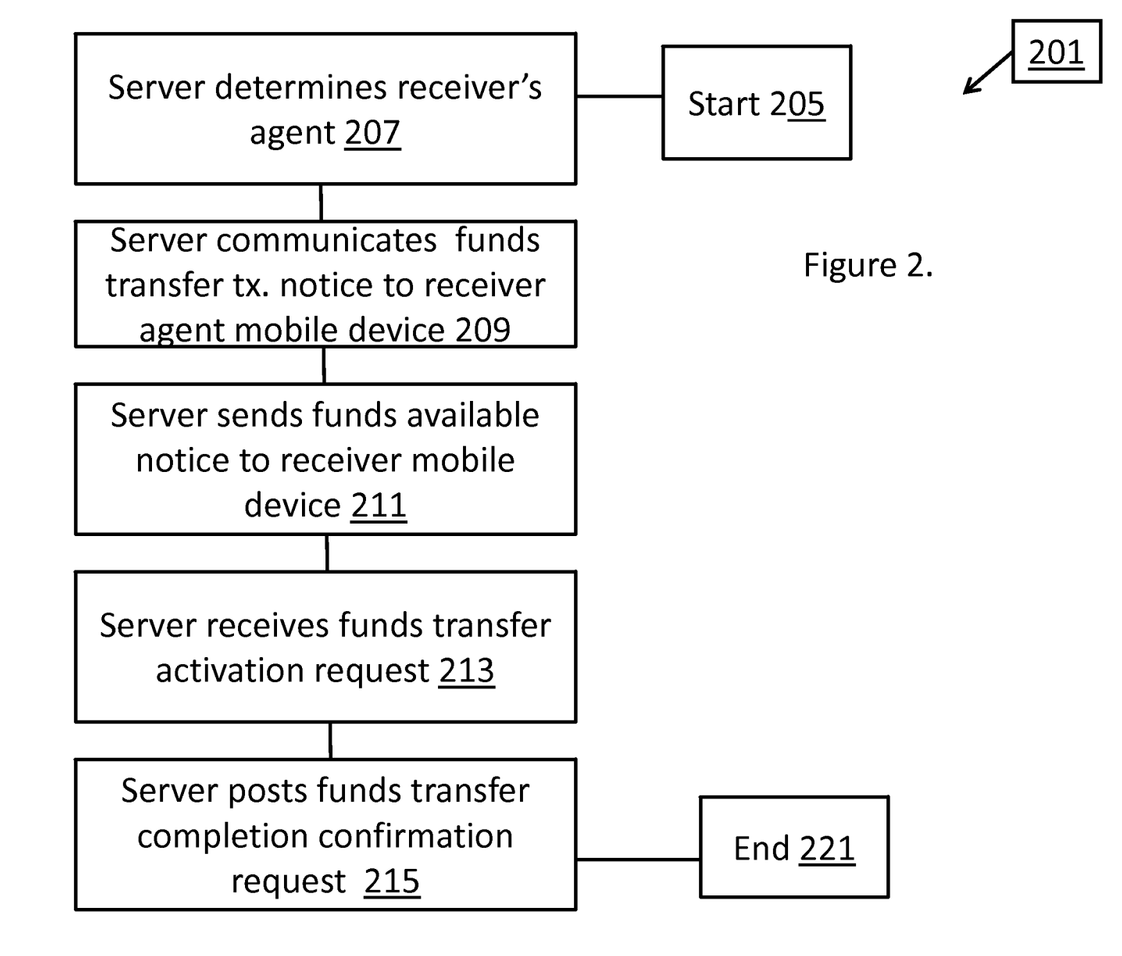
FIG. 2 is a flow chart of an exemplary funds transfer operation of an exemplary server that facilitates funds transfer.

FIG. 2 is a flow chart of an exemplary funds transfer operation of an exemplary server that facilitates funds transfer. The process starts at a start block 205 where the server receives a request for funds transfer. Then, at a next block 207, the server determines an appropriate one of a plurality of agents as a receiver's agent currently in proximity to a receiver, based on a receiver address or receiver phone number. At a next block 209, it communicates an incoming funds transfer transaction notice to a receiver agent mobile device associated with the receiver's agent.

Then at a next block 211, it sends a funds available notice to a receiver mobile device along with a second one-time-use token, wherein the receiver mobile device is associated with the receiver, and employs the receiver phone number. Then, at a next block 213, the server receives a funds transfer activation request from the receiver agent mobile device along with the second one-time-use token communicated by the receiver agent mobile device. At a next block 215, the server posts a funds transfer completion confirmation request to the receiver mobile device and receives a funds transfer completion confirmation response from the receiver mobile device. Then the operation terminates at a next end block 221.

The flow chart described above is generic, in that it is used for more than one scenario. In one scenario where the sender initiates funds transfer using the sender's own mobile device, the sender uses his bank account as a source of funds that is transferred, and the receiver agent is located by the server based on receiver's information provided by the sender, such as receiver mobile phone number, receiver address, receiver name, etc. In a different scenario, the sender employs a cash or cheque to pay for the funds transfer, and approaches a sender agent (in proximity, determined by searching for one on the server, for example) to seek help. The sender agent accepts the cash or cheque from the sender, and communicates a request for funds transfer to the server using the sender agent mobile device.

In one embodiment, the flow chart of FIG. 2 further comprises the steps of reimbursement to the receiver agent who provides funds (in cash form, checks on a local bank or a combination thereof) to a receiver. In specific, at a block 231, the server initiates a reimbursement transaction with a banking system to reimburse the receiver agent for the amount associated with the incoming funds transfer transaction notice, optionally factoring in a transaction commission, wherein the reimbursement transaction refers to a receiver agent bank account associated with the receiver agent. The server is communicatively coupled to the banking system and initiates the execution of the reimbursement transaction by the banking system. This block is invoked after the block 215. It then invokes the end block 221.

In a different embodiment, the flow chart of FIG. 2 further comprises the steps of seeking approval from the sender for the transfer before the receiver's agent provides cash and or cheques to the receiver. Specifically, at a block 235 after the start block 205, before the block 207, the server gets a funds transfer request from a sender's mobile device communicatively coupled to the server and, in response, it communicates a first one-time-use token to the sender's mobile device, before determining the receiver's agent. The determination of the receiver's agent is based, at least in part, on a perceived current location of the receiver. This could be based on current GPS coordinates from the receiver's mobile phone, an address, a phone number, etc.

Then, at a block 237, after the block 213, the server pushes a funds transfer approval request to the sender's mobile device, and receives the first one-time-use token in response, and verifies it, after receiving a funds transfer activation request from the receiver agent mobile device.

In yet another embodiment, the server gets a funds transfer request from a sender agent's mobile device communicatively coupled to the server and communicating a first one-time-use token to the sender's mobile device, before determining the receiver's agent. It then pushes a funds transfer approval request to the sender's mobile device, and receives the first one-time-use token in response, and verifying it, after receiving a funds transfer activation request from the receiver agent mobile device.

The reimbursement transaction that the server conducts to reimburse a receiver agent (for example) also involves an originating bank account, wherein the originating bank account is associated with a sender, the sender's agent, or a service provider associated with the server, etc. The originating account is managed by the banking system, and it is referenced in the reimbursement transactions, as necessary, so that the funds could be transferred directly into the receiver's agent's bank account, or, as necessary, into a different bank account first, before the receiver's agent's bank account is transferred the amount (plus any commission due).

In one embodiment, the server collects, into an escrow bank account, an originating amount including an optional service commission amount after selectively conducting an originating transaction with a sender bank account associated with the sender or a sender agent bank account associated with the sender agent. The server transfers at least a portion of the originating amount from the escrow account to the receiver agent's bank account optionally factoring in a transaction commission, by initiating the reimbursement transaction. The reimbursement transaction selectively occurs after the receiver has indicated the receipt of the amount associated with the incoming funds transfer transaction notice from the receiver agent, or before the receiver has received the amount. This selection occurs, for example, based at least on the originating amount and a history of reliability of the receiver's agent available at the server. The escrow bank account is, for example, associated with and managed by the service provider of the funds transfer service.

In one embodiment, the server processes the incoming funds transfer transaction notice to determine if an escrow account needs to be employed before final reimbursement to the receiver agent's bank account. It then selectively initiate a reimbursement transaction with a banking system to reimburse the receiver agent for the amount associated with the incoming funds transfer transaction notice, optionally factoring in a transaction commission, or it selectively collects, into an escrow bank account, the amount associated with the incoming funds transfer transaction notice. This escrowed amount is later released to reimburse the receiver agent.

Figure 3:
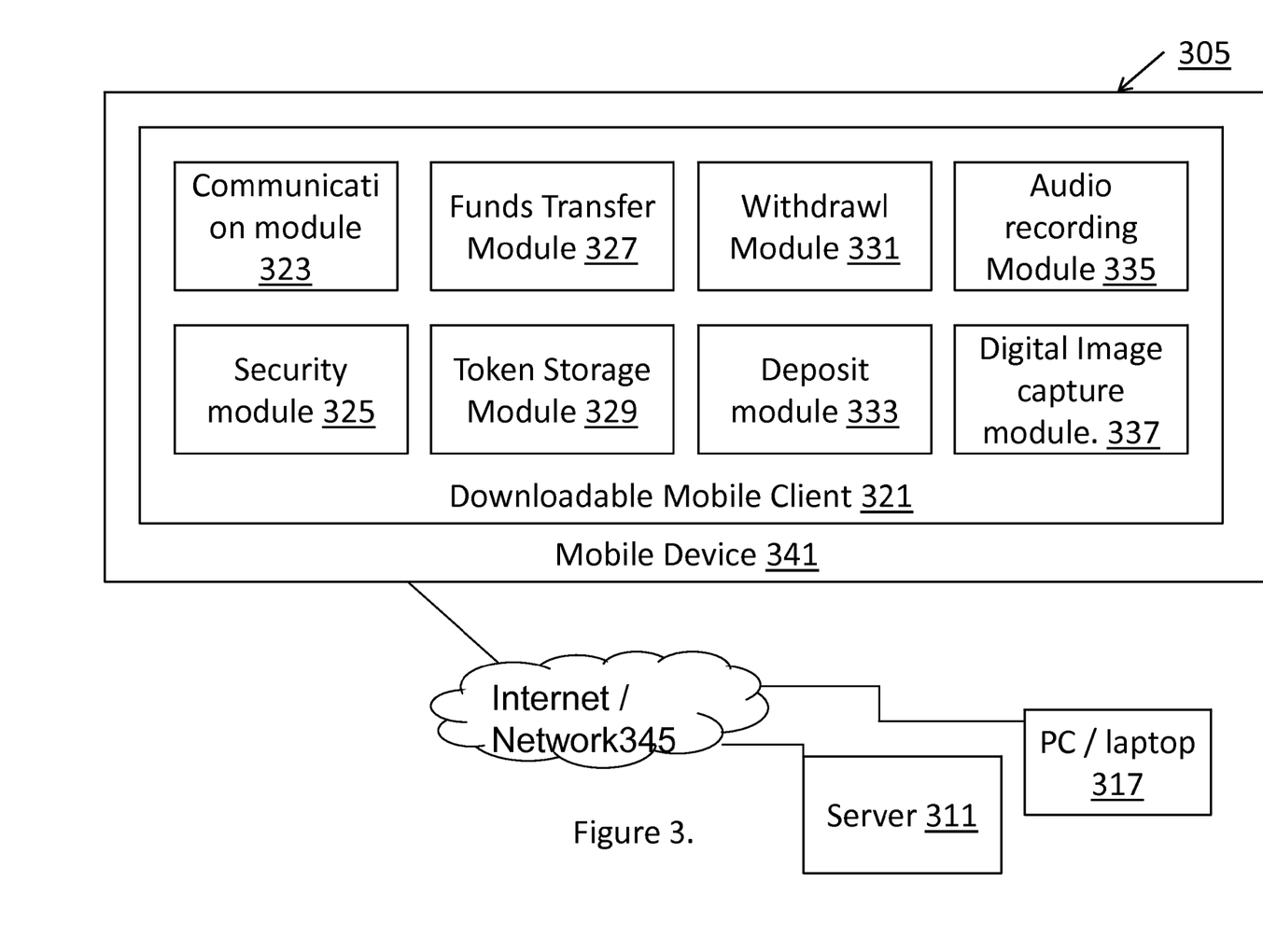
FIG. 3. is a perspective block diagram of a downloadable mobile client for conducting funds transfer and mobile banking by interacting with a system for managing funds transfer and banking.

FIG. 3. is a perspective block diagram of a downloadable mobile client 321 for conducting funds transfer and mobile banking by interacting with a system 205 for managing funds transfer and banking. The system comprises a server 311, a mobile device 341 and the mobile client 321 is communicatively coupled to the server 311. The mobile client 321 comprises a communication module 323 capable of interacting with the server 311, a security module 325 for secure communications, and a fund transfer module 327 that facilitates agent-assisted funds transfer, and a token storage module 329 for optional storage of tokens, such as one-time-use tokens. The fund transfer module 327 sends a funds transfer request and receives a first one-time-use token, displays it to the user, and optionally stores it for subsequent use in a local storage, such as the token storage module 329.

The mobile client 321 receives an acknowledgement message from the server 311 indicating progress in the funds transfer request and displays it to a user. The funds transfer module 327 receives and displays a funds transfer approval request from the server along with an optional digital image of the associated recipient to aid identification of a recipient. The funds transfer module 327 prompts the user to enter the first one-time-use token, accepts user input, and sends it to the server 311 for verification. It also displays a final status information for the funds transfer request that is received from the server 311. The downloadable mobile client 321 sends a funds transfer request (when initiated by a user) that comprises a transfer amount, a receiver name, a usercode, a passcode, a receiver bank account information, a receiver mobile phone number and an optional receiver's current address.

The downloadable mobile client 321 also comprises a withdrawal module 331 that facilitates agent-assisted withdrawal of funds from a bank account associated with a user. The withdrawal module 331 communicates a withdrawal request to the server 311 and receives a second one-time-use token, displays it to the user, and optionally stores it for subsequent use in a local storage (such as token storage module 329). It prompts the user to enter the second one-time-use token, accepts user input, and sends it to the server 311 for verification. It also displays a final status information for the withdrawal request that is received from the server 311.

In one embodiment, the downloadable mobile client 321 also comprises a deposit module 333 that facilitates agent-assisted deposit of funds into a bank account associated with a user. The deposit module 333 communicates a deposit request to the server 311 and receives a third one-time-use token, displays it to the user, and optionally stores it for subsequent use in a local storage. It prompts the user to enter the third one-time-use token, accepts user input, and sends it to the server 311 for verification. It displays a final status information for the deposit request that is received from the server 311.

In general, the downloadable mobile client 321 also comprises an audio recording module 335 that prompts a user to provide audio instructions along with the funds transfer request or a banking operation request. It digitally records the audio and communicates it to the server 311 along with the funds transfer request or the banking operation request.

The downloadable mobile client 321 is capable of displaying a photo of a receiver sent by the receiver agent from his mobile device 341, and approve a funds transfer transaction, so that money can be disbursed to the receiver by the receiver agent. This visual verification of a receiver by the sender is in addition to the entry of a one-time-use-passcode that the sender has to enter when prompted as part of the verification before funds are disbursed to the receiver.

The security module 325 provides secure (SSL layer or TLS layer based) communication means, as necessary. This is orthogonal to the use of login ids and password for the downloadable mobile client 321, customer ids, and passcodes for funds transfer transactions, and the use of one or more one-time-use passcodes that discourage repeated or unauthorized attempts to receive funds or approve funds transfer.

A digital image capture module 337 in the mobile device 341 facilitates capture of photos by a user for communication to the server 311 as part of a user request for funds transfer, or as part of a user request for approval of funds transfer, etc.

In one embodiment, the downloadable mobile client 321 is loaded/made available to the mobile phones of the sender, the sender's agent, the receiver's agent as well as the receiver. Thus all human participants in funds transfers and mobile banking employ the downloadable mobile client 321 (or versions of it as appropriate to their mobile device platform).

In addition to supporting agent-assisted funds transfer and banking operations such as deposit and withdrawal operations, the downloadable mobile client 321 also supports funds transfer between a bank account of a user to another bank account of the same user or a different user, without the need to involve agents, as in some of the agent assisted funds transfer operations previously described above.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

Although the present invention has been described above in terms of funds transfer and banking operations, the present invention is not limited to such embodiments. It will be obvious to one of average skill in the art that various other human activities, such as mail delivery services, package delivery services, document delivery services can adopt this invention to solve similar or related problems.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A system supporting plurality of mobile devices used by a plurality of users for managing funds transfer and banking, the system comprising:
   a server computer comprising processing circuitry, memory coupled to the processing circuitry and network circuitry;
   the server computer receives a funds transfer request from a first mobile device communicatively coupled to the server computer and communicates a first one-time-use token to the first mobile device;
   the server computer receives a funds transfer initiation notice from a second mobile device communicatively coupled to the server computer and communicates an acknowledgement message to the first mobile device;
   the server computer determines an appropriate third mobile device and communicates an incoming funds transfer transaction notice to the third mobile device;
   the server computer communicates a funds available notice to a fourth mobile device along with a second one-time-use token;
   the server computer receives a funds transfer activation request from the third mobile device along with the second one-time-use token communicated by the third mobile device;
   the server computer sends a funds transfer approval request to the first mobile device, receives the first one-time-use token, and verifies it; and
   the server computer sends a funds transfer completion confirmation request to the fourth mobile device and receives a funds transfer completion confirmation response from the fourth mobile device.

2. The system of claim 1 further comprising:
   a banking interface to interact with a first bank system;
   the banking interface also being employed to interact with a second bank system;
   the server computer communicates, employing the banking interface, a first transaction request to a first bank account at the first bank system after receiving the funds transfer initiation notice; and
   the server computer communicates, employing the banking interface, a second transaction request to the second bank system after receiving the funds transfer completion request.

3. The system of claim 2 wherein the first bank and the second bank are the same bank.

4. The system of claim 2 wherein the second mobile device is not employed and wherein the server computer also receives the funds transfer initiation notice from the first mobile device and communicates the acknowledgement message to the first mobile device.

5. The system of claim 2 wherein the first mobile device is employed by a sender of funds, the fourth mobile device is employed by a receiver of the funds, the second mobile device is employed by a sender's agent associated with a first bank account managed by the first bank system, and the third mobile device is employed by a receiver's agent associated with a second bank account managed by the second bank system.

6. The system of claim 5 wherein the funds transfer request comprises one or more items from a set comprising a transfer amount, an optional preferred transfer date, a recipient detail, and user identification, sender account identification, receiver account identification, receiver name, receiver address, receiver mobile phone number, receiver bank account information, preferred currency for transfer and a mobile transaction passcode.

7. The system of claim 6 wherein the server computer identifies the receiver's agent from a set of registered agents maintained by the server computer, based at least on receiver address, and communicates a location information of the receiver's agent to the receiver of the funds via the fourth mobile device, along with the second one-time-use token.

8. The system of claim 1 further comprising:
   a banking interface to a first bank system;
   the server computer communicates a first transaction request to the first bank system employing the banking interface after receiving the funds transfer initiation notice, wherein the first transaction request identifies a first bank account, an amount, a second bank account with which a financial transaction must be conducted, and details of the second bank account; and
   the server computer receives confirmation from the first bank system on successful end to the first transaction request and then communicates the incoming funds transfer transaction notice to the third mobile device and the funds available notice to the fourth mobile device along with a second one-time-use token.

9. The system of claim 1 wherein the funds transfer initiation notice from the second mobile device indicates payment received for the funds transfer via a check or by cash provided by a first user using the first mobile device.

10. The system of claim 1 wherein the funds transfer completion confirmation response from the fourth mobile device indicates receipt of funds transferred by a fourth user managing the fourth mobile device.

11. The system of claim 1 wherein the funds transfer approval request to the first mobile device is preceded by viewing of a new digital photo of the intended receiver communicated by the third or the fourth mobile device.

12. The system of claim 1 wherein the use of the first one-time-use token is optional.

13. The system of claim 1 wherein the funds transfer initiation notice from the second mobile device indicates payment received for the funds transfer from a financial account with sufficient funds provided by a first user using the first mobile device.

14. The system of claim 1 wherein the first and second mobile device are a same first unit, and the third and fourth mobile device are a same second unit.

* * * * *